May 21, 1957
C. J. GLANZER
2,792,908
FILTERING MEANS
Filed Dec. 7, 1954
3 Sheets-Sheet 1
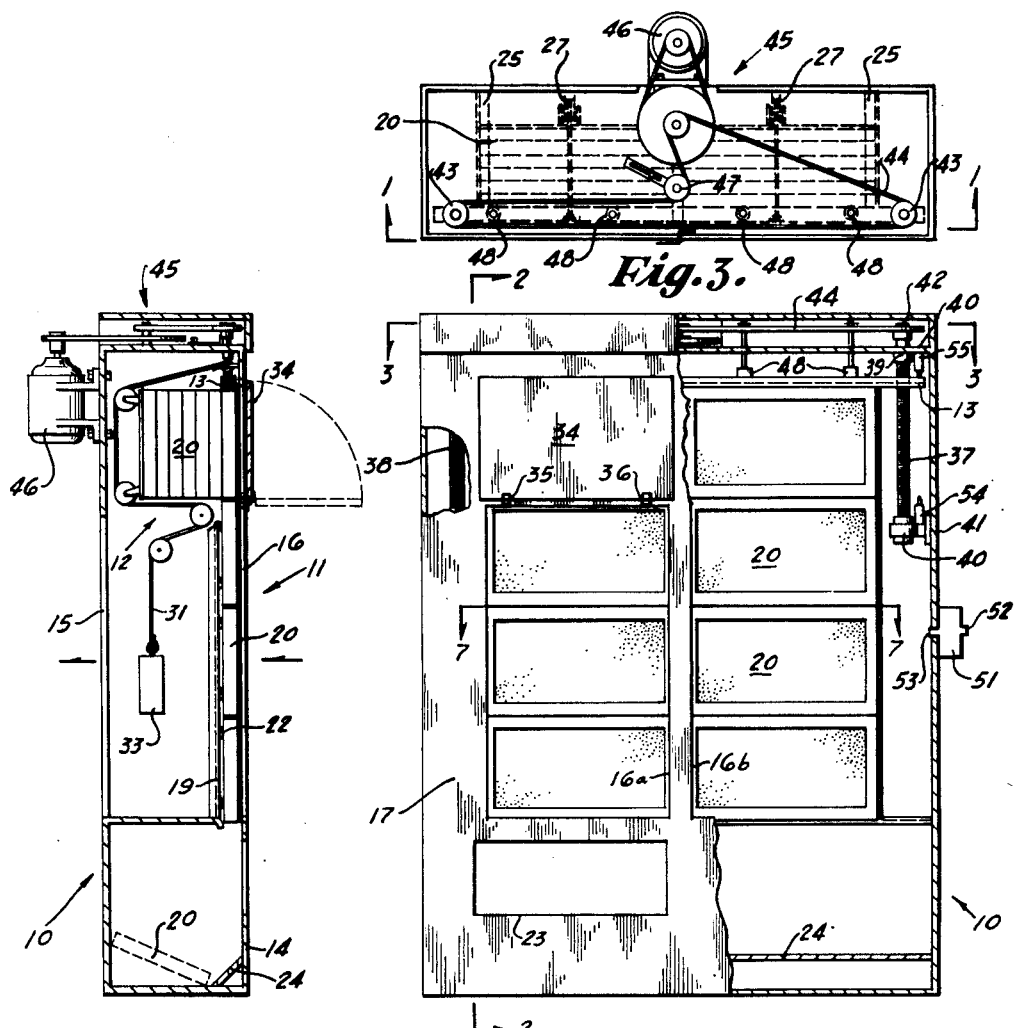
Fig. 3.
Fig. 2.
Fig. 1.
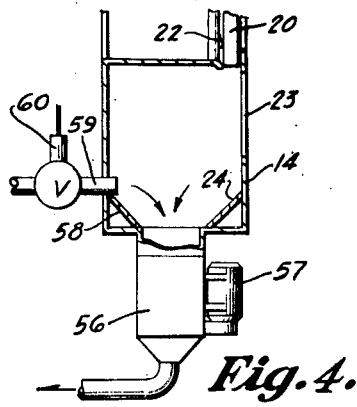
Fig. 4.
CLARENCE J. GLANZER
INVENTOR.
BY
ATTORNEYS.

May 21, 1957  C. J. GLANZER  2,792,908
FILTERING MEANS
Filed Dec. 7, 1954  3 Sheets-Sheet 2

CLARENCE J. GLANZER
INVENTOR.

BY
ATTORNEYS.

CLARENCE J. GLANZER
INVENTOR.

BY
Browning Simmons & Hyer
ATTORNEYS.

United States Patent Office 2,792,908
Patented May 21, 1957

2,792,908

FILTERING MEANS

Clarence J. Glanzer, Houston, Tex.

Application December 7, 1954, Serial No. 473,548

5 Claims. (Cl. 183—62)

This invention relates to a filtering apparatus and, more particularly, to an apparatus for automatically changing filters in a mechanical draft ventilation system at periodic intervals. In one important aspect, it relates to an automatic filter changing apparatus in combination with a means for automatically disposing of spent filters.

Modern buildings are turning more and more to forced draft heating and cooling systems for year around control of the inside temperature of the building. In such systems, it is desirable, and in fact usually necessary, that as much as possible of the dust in fresh air introduced into the building be filtered out so that dust will not collect in excessive amounts in the heating and air-conditioning equipment and impede free flow of air therethrough. The removal of as much dust as possible from air introduced into the building is also desirable for other reasons such as reducing the amount of housekeeping necessary within the buildings, removing pollen which causes people addicted to hay fever to suffer, etc.

One of the problems encountered in using filters in mechanical draft systems is that the filtering elements rapidly become clogged with filtered matter and inasmuch as the amount of filterable matter in the atmosphere changes from time to time, the life of a filtering element depends upon the amount of dust in the atmosphere. This, of course, necessitates changing the filters after unequal periods of use and either the filters must be frequently inspected so that a clogged filter will not be left in the system to create a back pressure and reduce the amount of air being circulated, or filters must be removed before the end of their useful life to provide an adequate safety factor.

It is necessary to manually change the individual filters in the filter bank each time they become clogged. It will be appreciated that in large buildings the frequency of replacement of these filters is a costly item particularly in view of the practice in many commercial buildings of having an outside service man maintain the filter bank. While the time involved in changing filters is usually not excessive, the travel time for the service man in traveling to and fro from his place of business to the filter bank materially increases the labor cost.

From the above it is believed the need for an economical, practical automatic filtering changing device is apparent. One form of automatic filter presently in use includes a group of filter elements carried by an endless chain mechanism with a portion of the chain passing through an oil bath to clean the filter elements. The original installation of this type of apparatus is quite costly and its maintenance is also costly due to the necessity for frequent scraping of the sump and replacement of the oil bath. The oil bath is, of course, a considerable fire hazard. This type of apparatus cannot guarantee against building up an excessive back pressure as the cleanliness of the individual filters depends upon the cleanliness of the oil bath. Thus, the back pressure will continuously increase during the life of an oil bath, and if the oil is not changed in time, an excessive back pressure will result.

It has heretofore been proposed that a continuous piece of filter material be mounted on rollers and passed through the filter bank as necessary to maintain clean filtering material in the bank. The industry, however, has continued to prefer the use of individual filters which may be disposed of after use or the individual permanent type filters which may be washed, re-oiled, and re-used, to the continuous length of filtering material. By individual filters is meant an integral body of filtering material of a size to cover all or a part of an air passageway as contrasted with a continuous length of material which will successively cover an air passageway several times. The filter should be stiff enough to permit handling, and for this purpose is usually provided with a framework, usually rectangular, about the periphery of the body of material. Such filters are in extensive use today, as for instance, the spun glass filtering medium which is provided with a rectangular frame of cardboard.

In some instances, it is also desirable to automatically dispose of the clogged filters after they are ejected from the filter bank. Modern technological warfare dictates protection of key industries, military nerve centers and insofar as possible the general public from chemical, biological and radiological attack. Ventilated shelters for this protection will probably require removal of solid and liquid material and bacteria as well as radioactive material. Filters in which such filtered material is collected would be highly dangerous to handle. Another type of installation in which automatic disposal would be desirable would be where the filter bank is used in conjunction with ventilating apparatus in a building in which some of the dust particles are radioactive. Their concentration within the building may not be such as to be dangerous, but when collected in the filter bank their concentration may increase to the point of being dangerous to an operator in removing and disposing of the spent filters. Thus, it would be desirable to have a means for automatically disposing of spent filters in such installations.

It is an object of this invention to provide a filtering apparatus for use in conjunction with a mechanical draft ventilating system in which individual filters are automatically replaced in the filter bank as they become clogged.

Another object is to provide an apparatus for automatically changing individual filters in a filter bank as they become clogged in which a large number of clean filters are fed through the filter bank before it is necessary to replenish the store of clean filters.

Another object is to provide an apparatus for changing individual filters in a filter bank at periodic intervals.

Another object is to provide a means for automatically changing filters in a filter bank in response to the pressure differential across the filter bank.

Another object is to provide a means for automatically replacing individual filters in a filter bank as they become clogged in combination with a means for automatically disposing of the clogged filters.

Other and further objects, advantages and features of this invention will be apparent from the written specification and claims taken together with the drawings.

In the drawings wherein there is shown by way of illustration one embodiment of this invention and wherein like numerals indicate like parts:

Fig. 1 is a view in elevation of the intake side of apparatus embodying this invention with parts broken away to illustrate details of the apparatus;

Fig. 2 is a view in vertical cross section of the apparatus of Fig. 1 taken along the lines 2—2 of Fig. 1;

Fig. 3 is a view in horizontal cross section taken along the lines 3—3 of Fig. 1;

Fig. 4 is a fragmentary view similar to Fig. 2 with the apparatus shown partly in vertical cross section and partly in elevation and modified to include a means for automatically disposing of spent filters;

The filtering apparatus includes a housing indicated generally at 10 adapted to be placed in a mechanical draft ventilating system to position the filter bank indicated generally at 11 across the air passageway of the ventilating system. Clean filters are stored in a hopper indicated generally at 12 and as needed the clean filters are automatically fed into the filter bank by an ejector bar 13. Movement of the clean filters into the filter bank will eject the lowermost of the clogged filters in the bank which will fall into receptacle 14, whence it will be stored until removed when the supply of clean filters in the hopper is replenished. The ejector bar may be operable in response to any desired variable such as time or the pressure differential across the filter bank as in the illustrated embodiment.

If desired, the receptacle may include a means for disintegrating and disposing of the clogged filters such as the pulverizing and flushing means shown in Fig. 4.

Referring now more in detail to the drawings, housing 10 is air-tight with the exception of passageways 15 and 16 on opposite sides of the housing. Passageways 15 and 16 are adapted to open into the duct work of a mechanical draft ventilating system so that the apparatus will form a part of such system. The air-tight housing will insure that the draft will pass through the filter bank and that air will not enter into the system through other parts of the housing. The apparatus may be positioned in a closed portion of a ventilating system or in the fresh air intake.

Figure 7:
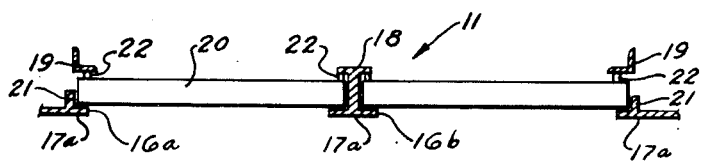
Fig. 7 is a view in horizontal cross section of the filter bank of the apparatus taken along the lines 7—7 of Fig. 1.

The guideways of filter bank 11 are constructed and arranged to position the filter bank over passageway 16 so as to filter air entering the housing through this passageway. The guideway includes confronting channel-like guides in which individual filters of conventional construction may slide with resilient means bearing against the individual filters to suspend them in the guideway. A suspending means of some type such as the resilient means illustrated would be used with a filtering device designed for downward movement of the filters through the bank, but it will be understood that where the filters move upwardly or sidewise through the bank the resilient means might be dispensed with. Preferably, two groups of filters in individual guideways are employed with a number of individual filters being used to make up the filter bank. It will be appreciated that the filtering device of this invention might employ any number of guideways with any number of individual filters in each guideway to make up a filter bank. The housing 10 is provided on its intake side with a wall 17 in which two rectangular vertically extending openings 16a and 16b are cut to form inlet 16. The portion 17a (Fig. 7) of wall 17 lying immediately to either side of holes 16a and 16b comprises a portion of the guideway. The intermediate guide is completed by securing a T-beam 18 to the back side of wall 17 to form a member which is H-shaped in cross section in which the individual filtering elements may slide as best shown in Fig. 7. Each of the outside channels is formed by a vertically extending angle member 19 carried by the housing and spaced from wall 17 of the housing a distance to permit individual filtering elements 20 to pass therebetween, and a vertically extending flange 21 carried by the housing and spaced from the upright of T-beam 18 a distance to receive the filtering element 20 between the flange and T-beam 18. A plurality of leaf springs 22 are secured to angle members 19 and to T-beam 18 and bear against individual filtering elements 20 to suspend them within the guideway. It will be understood that any form of guideway and any form of friction means to suspend the individual filtering elements in the guideway may be utilized without departing from the spirit of this invention.

The outlet of guideway 11 opens into a receptacle 14 positioned below the guideway for receiving filters which have become clogged and have been ejected from the guideway. This receptacle 14 is provided with an access opening 23 through which clogged filters may be removed when servicing the filtering apparatus. The receptacle 14 is provided with a plate 24 positioned in its bottom directly below the outlet of guideway 11 and inclined from wall 17 at approximately a 45° angle. As shown by the individual filter 20 in dashed outline, this plate will cause the ejected filters to assume a horizontal position in the receptacle and clear the space below the outlet from the guideway.

Figure 6:
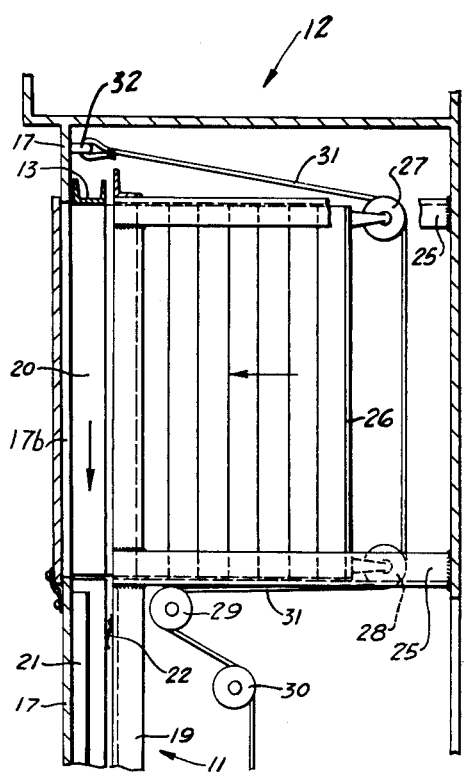
Fig. 6 is a fragmentary view along the lines 6—6 of Fig. 5.

Adjacent the upper end or mouth of guideway 11 there is provided a hopper 12 for storing clean filters and a means for automatically moving the clean filters from the hopper successively into the guideway. The hopper is made up of one or more identical sections, with one section for each guideway in the filter bank. Each hopper section includes four angle irons 25 which extend parallel to each other and perpendicular to the guideway so that filters may be stacked in the hopper with their broad faces parallel to the broad faces of filters in the guideway. Individual filters are usually rectangular in configuration and angle irons 25 should be positioned in rectangular fashion in a manner to freely receive the individual filters with their edge faces resting upon the lower two angle irons 25. As best shown in Fig. 6, angle irons 25 should be positioned with one end terminating in the plane of the guide surface of member 19. With this arrangement the hopper will overlie the mouth of the guideways and a filter may be moved from the hopper to a position overlying a guideway.

Preferably, means is provided for automatically positioning the filters in the hopper successively over the mouth of the guideway. This means may take the form of a biasing means, biasing the filters toward the end of the hopper which overlies the mouth of the guideway as illustrated in the drawings. The biasing means illustrated includes a pressure plate 26 which slides within the four angle irons 25 and carries on its back side adjacent its upper and lower edges a pair of sheaves 27 and 28. These sheaves are positioned midway the horizontal dimension of the plate 26 so that a biasing force may be transmitted to the plate through these sheaves without cocking the plate. A pair of idle rollers 29 and 30 are mounted in the housing just rearwardly of the filter bank and a rope 31 is tied to wall 17 above the hopper at 32 and is run over sheaves 27, 28, 29 and 30 successively. A weight 33 is secured to the free end of rope 31 and provides the biasing force. Sheave 29 should be positioned closely adjacent the bank of filters so that weight 33 will provide a biasing force on plate 26 until plate 26 substantially reaches the mouth of the guideway. Pulley 30 is spaced from the filter bank to space weight 33 from the filter bank and prevent the weight from becoming entangled with the bank. As shown in Figs. 1 and 3, the hopper is loaded with two groups of filters 20, each group being supported in its separate set of angle irons 25 and provided with a separate means for biasing the filters toward the end of the hopper overlying the guideway.

Hopper doors 34 are provided in wall 17 in front of each hopper section. The doors are hinged at 35 and 36 to open downwardly and provide a platform for use while loading filters into the hopper. Underlying each door 34 is a rectangular opening 17b for loading filters into the hopper. The vertical dimension of opening 17b is greater than the vertical dimension of the individual filters to freely pass a filter. The horizontal dimension of opening 17b is slightly less than the horizontal dimension of the individual filters in the guideway so that filters urged toward door 34 will be arrested by abutting against the inside face of wall 17 of the housing. The horizontal dimension of opening 17b may be the same as opening 16a. Of course, the filters may be cocked in loading the hopper so as to pass through opening 17b.

Individual filters are successively moved from the hopper into the guideways by an ejector bar 13 which is mounted upon lead screws 37 and 38 spaced on each side of the filter bank. Lead screw 37 is journaled for rotation in a bearing 39 in the upper plate 40 of housing 10 and in a bearing 41 carried by the side wall 41 of the housing. Lead screw 37 is threaded along its entire length and has threadedly mounted thereon ejector bar 13. A sprocket 42 is carried on one end of lead screw 37 and provides a means for imparting rotation to the lead screw. Lead screw 38 is mounted similarly to lead screw 37 and is provided with a sprocket 43 for imparting rotation thereto. A chain 44 is received about sprockets 42 and 43 and about a suitable speed reducing mechanism indicated generally at 45, which speed reducing mechanism is driven by reversible motor 46. An idling roller 47 is provided to maintain chain 44 taut. A suitable system of controls and limit stops govern the operation of motor 46 to drive chain 44 and hence raise and lower ejector bar 13 to move filters 20 from the hopper into the guideway.

Figure 5:
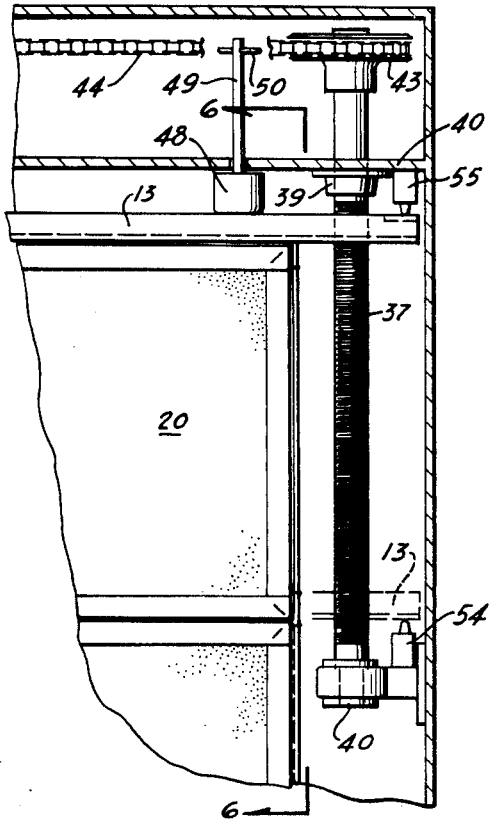
Fig. 5 is a view in vertical cross section on an enlarged scale of a fragment of the apparatus of Fig. 1.

As best seen in Fig. 2, the biasing means will position a filter directly over the mouth of guideway 11 and ejector bar 13 will be positioned directly over this filter so that downward movement of ejector bar 13 to its position indicated in dashed outline in Fig. 5 will move the filter into the guideway. As the ejector bar moves downwardly, the weight 33 will tend to move the filters in the hopper in behind the ejector bar and to prevent such movement there is provided a plurality of followers 48 slidably mounted in top plate 40 of the housing. These followers rest on the upper side of ejector bar 13 and move downwardly with ejector bar 13. The followers 48 are slidably mounted in plate 40 on slide bars 49 which carry transverse pins 50 in their free ends. As the followers move downwardly with ejector bar 13, transverse pins 50 come into contact with plate 40 to arrest further downward movement of the followers. Filters in the hopper will be engaged and prevented from moving in behind the ejector bar 13 by followers 48. As the ejector bar moves back up into its out-of-the-way position after ejecting a filter, the followers will, of course, be moved upwardly by the ejector bar into an out-of-the-way position.

The changing of the filters in the filter bank is accomplished automatically and for this purpose there is provided a means operable in response to a variable which kicks off the system and a series of limit switches which limit movement of the bar in both directions and which initiate upward movement of the bar after a filter has been moved from the hopper into the guideway. Preferably, the control means is responsive to the pressure drop across the filtering device, that is, across the bank of filters, so that maximum life may be had from a filter before it is ejected. This will permit the back pressure of the system to be maintained at a predetermined maximum. The illustrated embodiment employs a pressure responsive means shown diagrammatically at 51 to kick off the cycle of bar 13. Pressure responsive means 51 is opened to the atmosphere at 52 and to the inside of the housing at 53. When the differential between these two pressures reaches a predetermined value, pressure responsive means 51 will kick off the cycle of operation of bar 13. The apparatus shown is designed to be used with an induced draft for introducing fresh air into a ventilating system. The apparatus shown may also be used with a fan for introducing fresh air into a building. It will be understood that if placed in a closed portion of a ventilating system outlet 52 would be connected to the system upstream of opening 11.

When the pressure differential in control device 51 reaches a predetermined value, motor 46 is actuated to move ejector bar 13 downwardly by rotation of lead screws 37 and 38 to move a clean filter from the hopper into the upper section of guideway 11. Of course, the lowermost of the filters within the guideway will be ejected into receiver 14. As soon as the new filter is completely inserted into filter bank 11, ejector bar 13 will strike a limit switch 54 which will reverse direction of rotation of motor 46 and start the bar 13 on its upward journey. When bar 13 has returned to its starting position, that is, has cleared the stored filters a sufficient distance to allow a clean filter to move in between the bar and the bank of filters, the ejector bar 13 will strike a limit switch 55 which will stop rotation of motor 46 and allow bar 13 to come to rest. At this time the two upper filters in the bank of filters will be clean, the two lowermost filters will have been in the bank the longest period of time and will be the dirtiest, and the intermediate filters will have been in the bank a lesser period of time and will not be quite so dirty. The replacement of the dirtiest filters by a pair of clean filters will, of course, reduce the pressure differential across the filter bank and the filter bank will remain static until further operation of the system has resulted in the filters becoming clogged with filtered material to an extent which will increase the pressure differential to the predetermined value which will cause the apparatus to insert two more clean filters. By a suitable arrangement of the control system, the ejector bar could be made to move through three successive cycles upon operation of the control system to completely replace the filter bank in one operation if desired.

It will sometimes be desirable to dispose of clogged filters without human attention as for instance where the filtered material is radioactive and the concentration in the filters would be such as to be dangerous to an operator. In such case, it is contemplated that the filters will be disintegrated and flushed away to an underground disposal system or the like. Such disintegration may be done chemically or mechanically. Referring to Fig. 4, there is shown a means for mechanically disintegrating and flushing away clogged filters. A mechanical pulverizer 56 driven by a motor 57 extends across the bottom of receptacle 14 and clogged filters are directed into the mouth of the pulverizer by plate 24 and a like plate 58 which is opposed to plate 24. The mouth of pulverizer 56 will lie between these two plates and the plates will serve as inclined shelves directing clogged filters into the pulverizer where they will be ground into small particles. A liquid supply line 59 opens into receptacle 14 and provides a means for supplying liquid to the pulverizer to flush away the disintegrated filter. Preferably, operation of motor 57 is controlled so as to be operable only during the period of time directly after a filter has been ejected into receptacle 14. The liquid supply line 59 is also preferably provided with a control valve 60 which is open only during the period of time just after a filter has been dropped into the receptacle. Pulverizer 56 and valve 60 may be controlled by any convenient means such as by actuation of limit switch 54 at the end of downward travel of ejector bar 13.

Figure 8:
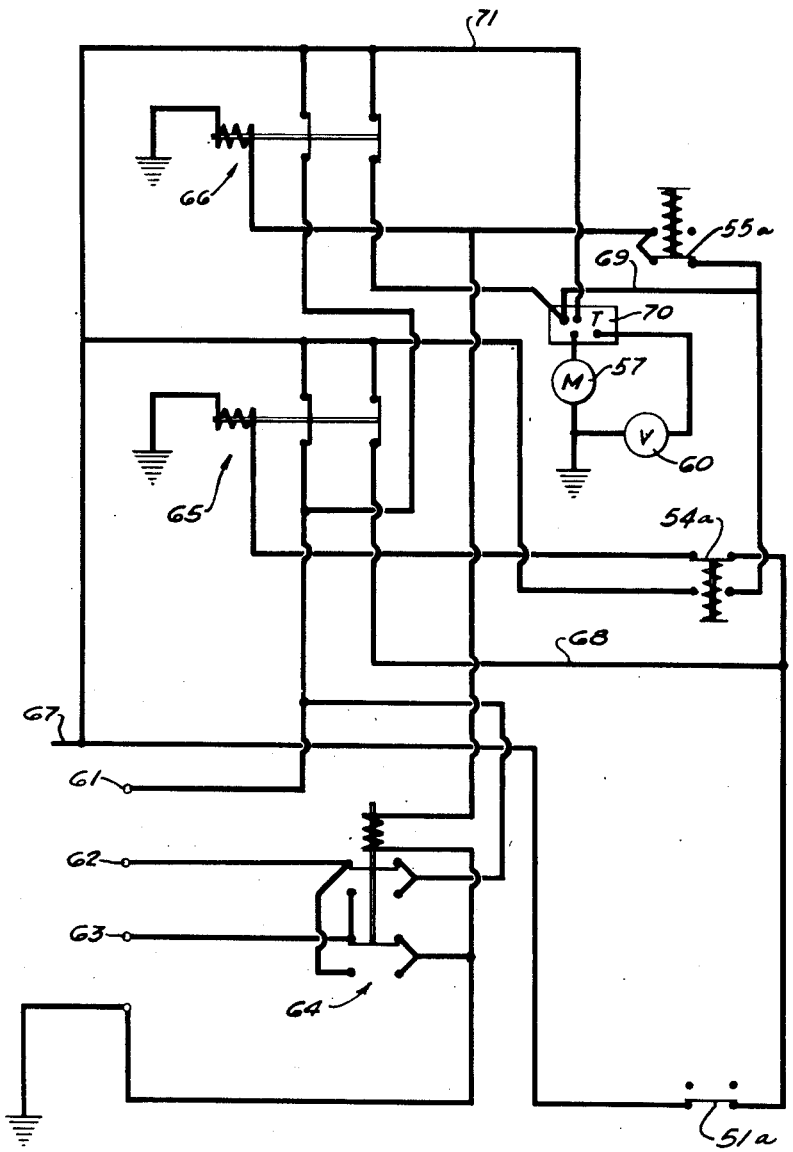
Fig. 8 is a schematic wiring diagram illustrating the manner of controlling the operation of the apparatus shown in Figs. 1 through 7.

Referring now to Fig. 8, there is shown a schematic wiring diagram of the means for controlling the operation of the filter changing apparatus. As will be apparent from the drawing, the pressure responsive switch and the limit switches are associated with relays to govern operation of the motor 46 through terminals 61, 62 and 63 which lead to motor 46. A relay indicated generally at 64 reverses the direction of operation of the motor when the ejector bar reaches the end of its stroke and actuates limit switch 54. A pair of relays indicated generally at 65 and at 66 are operated by the limit switches and the pressure responsive switch to connect the motor terminals to a source of electricity and to lock in the system and insure that the ejector bar 13 completes its cycle.

Considering now the diagram in detail, the hot line 67 is connected to the pressure differential device 51. Contact 51a is controlled by a pressure sensitive device and upon a predetermined pressure being reached contact 51a will interconnect hot wire 67 and relay 65 to close the relay. Once the relay 65 is closed, a separate source of current is fed to the relay through wire 68. Thus, if contact 51a opens before the ejector bar has completed its downward stroke, it will have no effect upon the motor. Closing of relay 65 will connect terminal 61 to source 67, and terminal 62 to source 67 through the two-way switch of relay 64. Terminal 63 will be connected through the two-way switch of relay 64 to ground as shown. From the above it will be understood that when contact 51a connects relay 65 to the source of current the motor will be energized to move ejector bar 13 downwardly to move an individual filter from the hopper into the filter bank. When ejector bar 13 reaches the lower limit of its travel, it will contact limit stop 54 which will move contact 54a downwardly, thus breaking contact between relay 65 and source 67 which will stop motor 46. Contact 54a is a two-way switch and in moving downwardly to open relay 65 will interconnect relay 66 and source 67 through contact 55a of upper limit switch 55. Again a lock in circuit is provided and relay 66 is connected to source 67 through wire 69 so that return of contact 54a to its initial position will not influence relay 66. This will permit the biasing of contact 54a upwardly as illustrated in the drawings. When relay 66 is closed, relay 64 will also be closed to operate the two-way switch of relay 64 and reverse direction of rotation of motor 46. In this instance, terminals 61 and 63 will be connected to source 67 and terminal 62 will be connected to ground.

Upon return of ejector bar 13 to its initial up position, it will break contact 55a to de-energize relay 66 and stop motor 46. At this time the ejector bar will have returned to its initial position and the cycle will be complete.

In installations where the pulverizer and liquid source shown in Fig. 4 are employed, a timer 70 may be connected in line 69 so as to be operated when the ejector bar reaches the limit of its downward travel. Timer 70 is tripped by closing of relay 66. However, it is preferred that operation of the pulverizer and flushing valve be independent of the limit switches once the timer has been tripped and for this reason timer 70 is independently connected to source 67 through line 71. Thus, when tripped by closing of relay 66, the timer 70 will be operated independently of the relay as will be understood by those skilled in the art. The timer controls a motor 57 and solenoid valve 60 to operate the pulverizer 56 and valve in conduit 59, respectively, which disintegrate and dispose of the filters ejected from filter bank 11. The timer may be set to run for any desired length of time. The timer might be tripped at any time during the cycle, operation by relay 66 being selected because when relay 66 is closed a filter has just been ejected from filter bank 11.

From the above it will be seen that all of the objects of this invention have been accomplished. There has been provided a machine for automatically changing individual filters in a filter bank which may be operated in response to the pressure drop across the bank, thus obtaining maximum life from the individual filters while preventing excessive back pressure on the ventilating system. There has also been provided means for automatically disposing of clogged filters where such disposal is desired.

With a machine constructed in accordance with this invention, the periodic servicing of the machine will be much less frequent than in ventilating systems not employing automatic changing means.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A filtering device for a mechanical draft ventilation system comprising, a housing adapted to be secured in a mechanical draft ventilating system, said housing having a passageway therethrough to permit air to pass through the device, an elongate guideway for positioning a plurality of filters in edge-to-edge relationship across said passageway to filter air passing therethrough, a hopper adjacent the mouth of the guideway for storing a plurality of individual filters, means for biasing filters in the hopper in a direction to position the filters successively at the mouth of the guideway, and means operable upon the occurrence of a predetermined pressure differential across the filtering device for automatically feeding said filters into one end of the guideway and ejecting filters clogged with filtered matter from the other end of the guideway.

2. A filtering device comprising, a housing adapted to be secured in a mechanical draft ventilating system, said housing having a passageway therethrough to permit air to pass through the device, a guideway for positioning a filter across said passageway to filter air passing therethrough, a hopper adjacent the mouth of the guideway for storing a plurality of individual filters, automatic means for replacing a clogged filter in the guideway with a clean filter from the hopper and ejecting the clogged filter into a disposal compartment, means in the disposal compartment for disintegrating an ejected filter, and means for flushing the disintegrated filter from the compartment.

3. A filtering device comprising, a housing adapted to be secured in a mechanical draft ventilating system, said housing having a passageway therethrough to permit air to pass through the device, a guideway for positioning a filter across said passageway to filter air passing therethrough, a hopper adjacent the mouth of the guideway for storing a plurality of individual filters, automatic means for periodically replacing a clogged filter in the guideway with a clean filter from the hopper and ejecting the clogged filter into a disposal compartment, mechanical means in the disposal compartment for disintegrating an ejected filter, and means for flushing the disintegrated filter from the compartment.

4. A filtering device for a mechanical draft ventilation system comprising, a housing adapted to be secured in a mechanical draft ventilating system, said housing having a passageway therethrough to permit air to pass through the device, a guideway including a pair of spaced confronting channel like members extending across the passageway for positioning a plurality of individual filters across said passageway in edge-to-edge relation to filter air passing therethrough, a hopper adjacent the mouth of the guideway for storing a plurality of individual filters, said hopper overlying the mouth of the guideway and extending transversely thereof, said hopper constructed and arranged to store filters positioned side by side and having their broad faces parallel with the broad face of a filter in the guideway, means for biasing filters in the hopper in a direction to position the filters successively over the mouth of the guideway, an ejector bar mounted for movement in the plane of the guideway toward and away from the mouth of the guideway from a point on the side of the hopper removed from the guideway to the mouth of the guideway, said bar engaging the back edge of a filter from the hopper and moving the filter into the guideway at one end thereof and simultaneously pushing a spent filter from the other end of the guideway, and means operable upon the occurrence of a predetermined pressure drop across the filtering device for automatically reciprocating the ejector bar toward and away from the guideway to replace a spent filter therein with a clean filter from the hopper and return the bar to its position on the side of the hopper opposite the guideway.

5. The filtering device of claim 4 in combination with means which follows the ejector bar into the space previously occupied by the filter at the mouth of the guideway as the ejector bar moves toward the guideway and prevents filters in the hopper from moving in behind the ejector means, said followers moved into an out-of-the-way position by the ejector means as it returns to its initial position.

References Cited in the file of this patent
UNITED STATES PATENTS

| | | |
|---|---|---|
| 2,119,978 | Wothuis et al. | June 7, 1938 |
| 2,532,642 | Senne | Dec. 5, 1950 |